United States Patent [19]
Scherowsky et al.

[11] Patent Number: 5,227,090
[45] Date of Patent: Jul. 13, 1993

[54] FERROELECTRIC, LIQUID-CRYSTALLINE POLYMERS, A PROCESS FOR THEIR PREPARATION AND THEIR USE IN ELECTROOPTICAL COMPONENTS

[75] Inventors: Günter Scherowsky; Uwe Müller, both of Berlin, Fed. Rep. of Germany

[73] Assignee: Hoechst Aktiengesellschaft, Frankfurt am Main, Fed. Rep. of Germany

[21] Appl. No.: 635,134

[22] Filed: Dec. 27, 1990

[30] Foreign Application Priority Data

Jul. 8, 1988 [DE] Fed. Rep. of Germany ....... 3823153

[51] Int. Cl.$^5$ ..................... C09K 19/20; C09K 19/12; C08F 122/14; C08G 63/02
[52] U.S. Cl. .......................... 252/299.01; 252/299.65; 252/299.66; 252/299.67; 526/313; 526/323; 526/326; 526/328; 528/192; 528/194
[58] Field of Search ...................... 252/299.01, 299.64, 252/299.65, 299.66, 299.67; 359/1.3, 104; 526/313, 320, 322, 323, 326, 328; 528/192, 194

[56] References Cited
U.S. PATENT DOCUMENTS

| | | | |
|---|---|---|---|
| 4,818,807 | 4/1989 | Morita et al. | 528/191 |
| 4,844,835 | 7/1989 | Uchida et al. | 252/299.01 |
| 4,904,065 | 2/1990 | Yuasa et al. | 359/103 |
| 4,995,705 | 2/1991 | Yoshinaga et al. | 359/103 |

Primary Examiner—Robert L. Stoll
Assistant Examiner—Shean C. Wu
Attorney, Agent, or Firm—Curtis, Morris & Safford

[57] ABSTRACT

Ferroelectric, liquid-crystaline polymers contain repeating units of the formula (I)

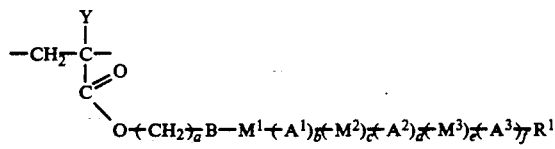

in which the symbols have the following meanings:
B=a group having at least one chiral center, of the formula

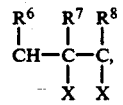

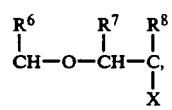

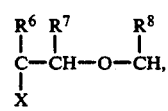

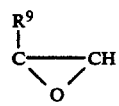

in which $R^6$, $R^7$ and $R^8$ are identical or different and are H, $CH_3$, $OCH_3$, F, Cl or Br, and at least one of the groups $R^6$, $R^7$ and $R^8$ must be H and X=H, F, Cl or Br and $R^9$=H or $C_1$-$C_{10}$-alkyl,
  Y=H, $CH_3$ or F,
  $R^1$=for example a straight-chain or branched alkyl having 1 to 16 carbon atoms
  a=2 to 20, preferably 6 to 12
  b, c, d, e and f=0 or 1 with the proviso that d+e+f=2 or 3
  $A^1$, $A^2$, $A^3$=for example, 1,4-phenylene or 2,5-pyridinediyl,
  $M^1$, $M^2$ and $M^3$=for example CO—O, or O—CO, and
  G=for example a straight-chain or branched alkylene having 1 to 16 carbon atoms.

6 Claims, No Drawings

FERROELECTRIC, LIQUID-CRYSTALLINE POLYMERS, A PROCESS FOR THEIR PREPARATION AND THEIR USE IN ELECTROOPTICAL COMPONENTS

BACKGROUND OF THE INVENTION
DESCRIPTION

Novel ferroelectric, liquid-crystalline polymers, a process for their preparation and their use in electrooptical components Liquid crystals have recently come into use in a variety of technical fields in which there is a requirement for certain electrooptical properties (for example low triggering voltages) combined with certain requirements concerning display or switching devices (for example flat construction, low weight). These devices currently utilize dielectric alignment effects in nematic, cholesteric and/or smectic liquid-crystal phases, the light transparency or reflectivity of the device being dependent on the electrical voltage applied.

A liquid-crystal display consists of two supporting plates, preferably glass plates, which are coated with transparent electrodes and, as a rule, with one or two alignment layers between which the liquid-crystal layer is located. Other components such as polarizers, color filters, passivating layers, anti-reflection layers, diffusion barrier layers and the like are in common use.

Although currently nematic or cholesteric liquid-crystal phases are still predominantly used, for some years ferroelectric, in particular smectic C*, liquid-crystal phases have been gaining in importance. Ferroelectric liquid crystals have the advantage of very short response times and allow high-resolution screens to be operated without the assistance of electronic elements, such as for example thin-layer transistors, which are necessary when using nematic or cholesteric liquid-crystal phases.

In all the above applications, the liquid crystals are low-molecular-weight liquid-crystalline compounds, i.e. having molecular weights of below 2000 g/mol, preferably below 800 g/mol, and in particular they are not polymers, copolymers, polycondensates or copolycondensates. Owing to their low viscosity, low-molecular-weight liquid crystals generally have the advantage of short response times; this is particularly true of ferroelectric liquid crystals, whose response times are in the range of $\mu$s and which therefore respond 10 to 1000 times faster than conventional nematic liquid-crystal phases.

However, on using ferroelectric liquid crystals, the problem of high susceptibility of the alignment to mechanical stress (shock, impact, pressure, heat distortion, bending and so on) can occur, which can lead to irreversible disruption of the image quality of a display. Currently, this high susceptibility impedes the construction of flexible ferroelectric LC displays and increases the cost of production of conventional displays, i.e. those with glass or rigid plastic plates.

The use of polymeric liquid crystals is advantageous owing to their lower deformability and better processability; their use allows flexible ferroelectric displays to be prepared. It is particularly advantageous to produce a display film in a continous process, but for this quick-response polymeric ferroelectric liquid crystals are needed. The present invention accordingly provides the novel polymeric, ferroelectric liquid crystals.

SUMMARY OF THE INVENTION

The novel compounds are polymers which are composed of repeating units of the formula (I)

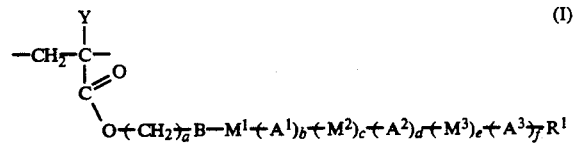

in which

B=a group having at least one chiral center of the formula

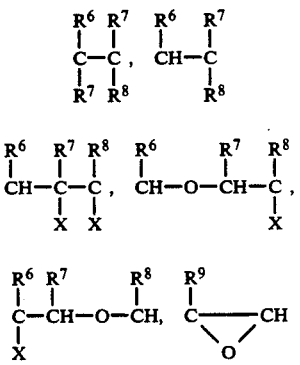

where $R^6$, $R^7$ and $R^8$ are identical or different and are H, $CH_3$, $OCH_3$, F, Cl or Br, and at least one of the groups $R^6$, $R^7$ and $R^8$ must be H and X=H, F, Cl or Br and $R^9$=H, or $C_1$-$C_{10}$-alkyl, Y=H, $CH_3$ or F, $R^1$=straight-chain or branched (with or without an asymmetric carbon atom) alkyl or alkenyl having 1 to 16 carbon atoms, in which one or two non-adjacent —$CH_2$— groups may also be replaced by —O—, —S—, —CO—, —CO—O13 , —O—CO—or —O—CO—O— and in which H may also be replaced by F, or $R^1$ is one of the following radicals

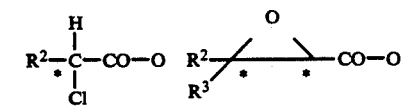

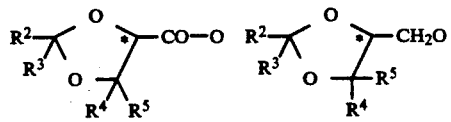

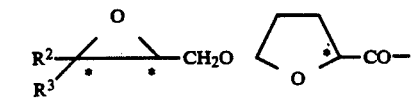

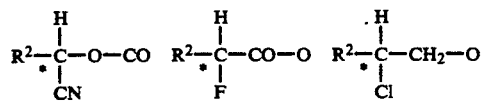

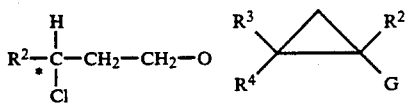

R², R³, and R⁵=H or straight-chain or branched alkyl having 1 to 16, or alkenyl having 2 to 16, carbon atoms, in which one —CH₂—group may also be replaced by —O—, —CO—O— or —O—CO—, or R² and R³, or R⁴ and R⁵, may jointly form a cyclic alkyl having 3 to 8 carbon atoms a=2 to 20, preferably 6 to 12 b, c, d, e and f =0 or 1 with the proviso that d+e+f=2 or 3

A¹, A² and A³=identical or different 1,4-phenylene in which 1 or 2 hydrogen atoms may be replaced by F, Cl and/or CN, trans-1,4-cyclohexylene in which 1 or 2 hydrogen atoms may be replaced by F, Cl, CN and/or CH₃, 2,5-pyrazinediyl, 3,6-pyridazinediyl, 2,5-pyridinediyl, 2,5-pyrimidinediyl, (1,3,4)-thiadiazole-2,5-diyl, 1,3-dioxan-2,5-diyl or 1,3-dithian-2,5-diyl.

M² and M³=identical or different CO—O, O—CO, CO—S, S—CO, CH₂—O or O—CH₂

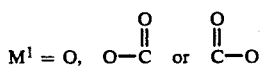

G=straight-chain or branched alkylene having 1 to 16 carbon atoms, or alkenylene having 2 to 16 carbon atoms, in which one or two non-adjacent —CH₂— groups may also be replaced by —O—, —S—, —O—CO—, —CO—O—, S—CO— or —CO—S—.

DESCRIPTION OF THE PREFERRED EMBODIMENTS

In this connection, preference is given to ferroelectric, liquid-crystalline polymers composed of repeating units of the formula (I) in which the group (—A¹)ᵦ(M²)ₑ(—A³)ₐ(—M³)ₑ(—A³)ᶠ— is:

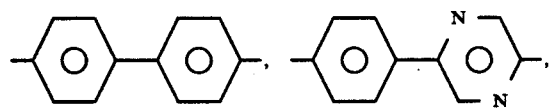

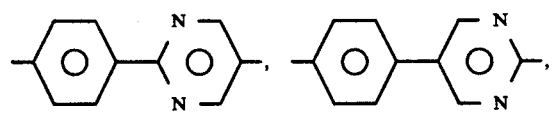

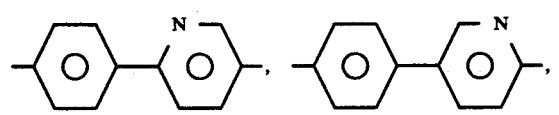

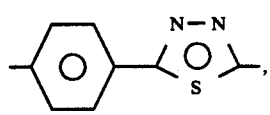

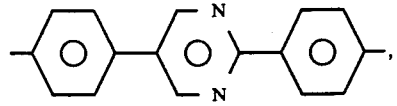

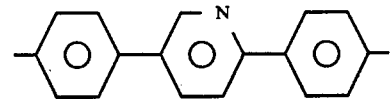

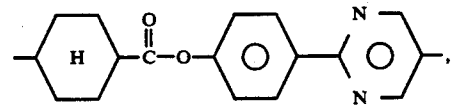

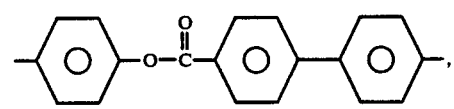

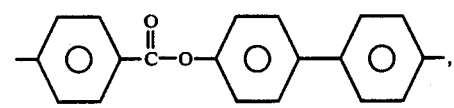

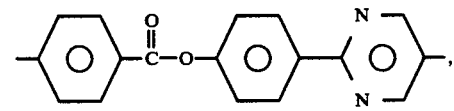

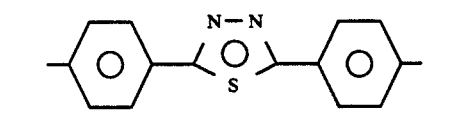

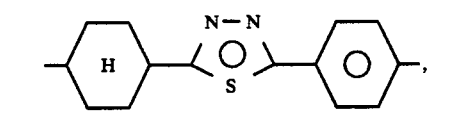

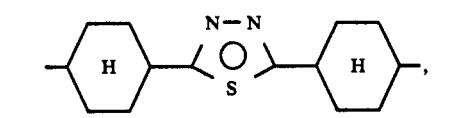

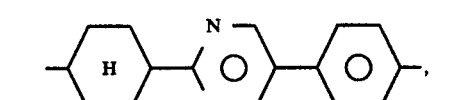

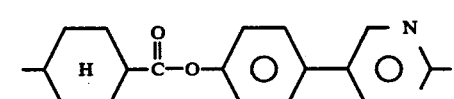

Particular preference is given to ferroelectric, liquid-crystalline polymers composed of repeating units of the formula (I) in which Y=H or CH₃, R¹=straight-chain or branched (with or without an asymmetric carbon atom) alkyl or alkenyl having 2 to 16 carbon atoms, in which one or two non-adjacent —CH₂— groups may also be replaced by —O—, —S—, —CO—, —CO—O—, —O—CO— or —O—CO—O— and in which H may be replaced by F, or

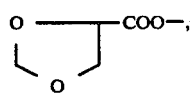

a=2 to 20, preferably 6 to 12, and the group (—A$^1$)-$_b$(—M$^2$)$_c$—(—A$^2$)$_d$(—M$^3$)$_e$(—A$^3$)$_f$— includes the following structures:

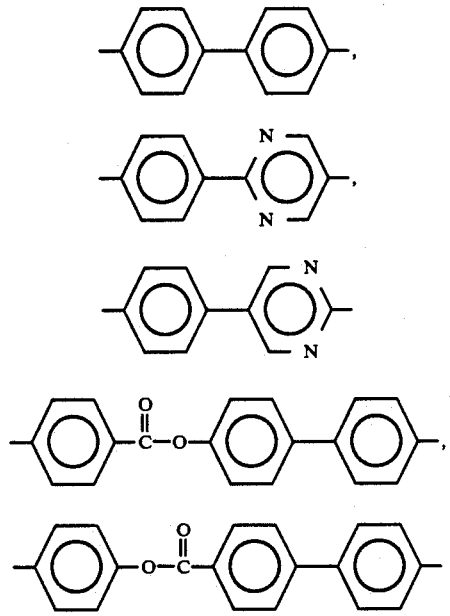

Particular preference is also given to those ferroelectric, liquid-crystalline polymers which are composed of at least two different monomer units of the formula (I).

These compounds are prepared by polymerization of the monomers of the formula (II)

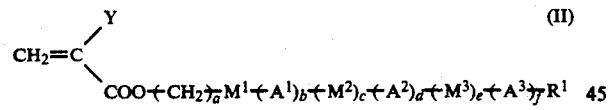

by known processes using a free-radical initiator.

The monomers of the above formula can be synthesized by known methods.

The polymers according to the invention are ferroelectric, liquid crystals which have response times of a few milliseconds and which can be used advantageously in electrooptical components and display devices.

EXAMPLE 1

Preparation of the monomer (M$_1$)

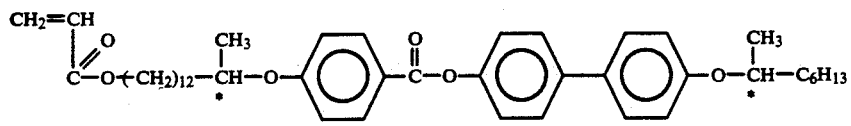

(A) 4(1-Methylheptyloxy)biphenyl 12-4-[4-(tetrahydropyran-2-yloxy)benzoate]

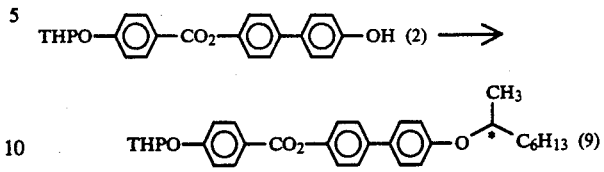

To a solution of 3.00 g (7.7 mol) of (2), 1.00 g (7.7 mol) of (S)-(+)-2-octanol, and 2.02 g (7.7 mol) of triphenylphosphine in 100 ml of abs. THF were added dropwise with stirring at 0°–5° C. and with the exclusion of moisture 1.34 g (7.7 mol) of diethyl azodicarboxylate in 20 ml of abs. THF, this occurring in the course of 5 min. The mixture is then stirred at 20° C. for 48 h.

Then the solvent is evaporated off and 25 ml of ethanol are added to the residue, this mixture is then filtered off and the precipitate is purified by flash column chromatography (FCC) (CH$_2$Cl$_2$/PE=1:1).

Yield: 2.06g (4.1 mol) 53%.

(B) 4(1-Methylheptyloxy)biphenyl (+)-4-hydroxybenzoate (10)

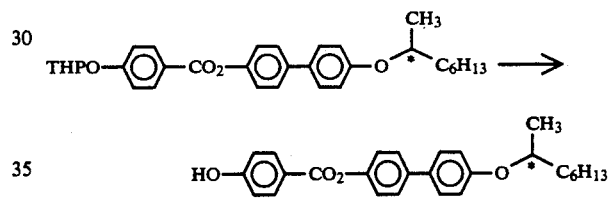

100 ml of methanol were added to 2 g (4 mmol) of (9) and after adding 0.15 g (0.6 mmol) of PPTS the mixture was heated at boiling point for 3 h.

The solvent is evaporated off to give a residual volume of 10 ml, and the product which has precipitated from the residue at 0° C. is filtered off under suction.

Yield: 1.50 g (90%).

[α]$_D$=1.8° (C=0.09 in CHCl$_3$).

(C) (S)-13-tetradecen-2-ol (11)

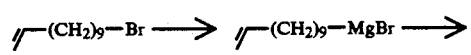

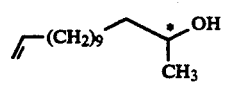

To a solution of 5.56 g (27 mmol) of CuBr (CH$_3$)$_2$ S in 40 ml of Et$_2$O (abs.) and 25 ml of (CH$_3$)$_2$S is added dropwise at −45° C. the Grignard solution (made from 6.29 g of 11-undecenyl bromide and 720 mg of Mg) and the mixture is stirred at this temperature for 2 h. Then, at −78° C., Li heptyne (made from 2.59 g of heptyne and 16.9 ml of BuLi (27 mmol)), 4.7 ml of HMPI and 30 ml of Et₂O absl. are added. After 1 h, 1.56 [lacuna] (27 mmol) of (S)-(−)-propylene oxide are added and stirring is continued for a further 2 h at −78° C., and then the mixture is left to stand at −23° C. for 24 h.

The product is then hydrolyzed using 50 ml of saturated NH₄-Cl solution, the phases are separated and the aqueous phase is subsequently extracted twice with ether. The combined organic phases are washed with saturated NaCl solution, dried and concentrated. The product is purified by flash column chromatography (FCC) using ether/petroleum ether mixtures of increasing polarity.

Yield: 2.6 g (12.2 mmol) 45%.

To a mixture of 820 mg (1.33 mmol) of (12) and 30 mg (0.8 mmol) of NaBH₄ in 10 ml of THF were added under an atmosphere of nitrogen 0.14 ml (0.8 mmol) of (CH₃O)₂SO. The mixture is stirred for 2 h at 40° C., and is then cooled to 5° C., and then 1 ml of 1 N NaOH and 0.5 ml of 30% strength H₂O₂ solution are added and stirring is continued for a further 20 min. Then two extractions are carried out using CH₂Cl₂, the combined organic phases are dried (MgSO₄), concentrated, and recrystallized from petroleum ether/ether.

Yield: 270 mg (0.43 mmol) = 32%.

(F) 4-(1-Methyl-heptyloxy)biphenyl (R,R)-4-[4-(13-aryloxy-tetradecenyl-2-oxy))benzoate] (M₁)

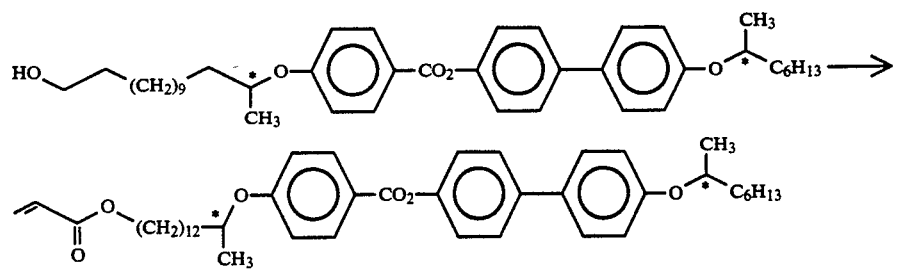

(D)
(2R)-4(4(13-tetradecen-2-y-loxy)benzoyloxy-4-(1-Methylheptyloxy)biphenyl ester (12)

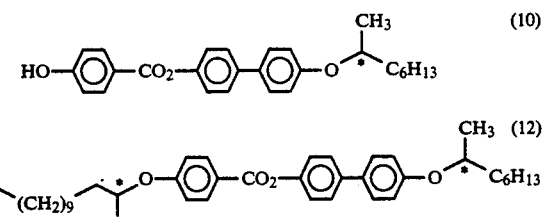

As described in the instructions for (9), 1.36 g (3.29 mmol) of (10), 693 mg (3.25 mmol) of (11), 565 mg (3.25 mmol) of DEAD and 851 mg (3.25 mmol) of triphenylphosphine in 50 ml of abs. THF were brought into reaction.

Yield: 910 mg (1. 48 mmol) of D=46%.

(E)
(R,R)-4-4-(14-hydroxytetradecen-2-yloxy)benzoyloxy]-4-(1-Methyl-heptyloxy)biphenyl ester (13)

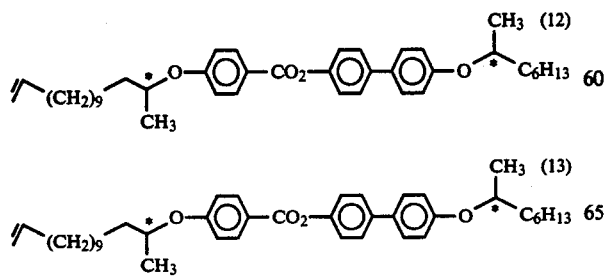

To a solution of 270 mg of (13) and 0.14 ml (0.1 mmol) of TEA in 10 ml of abs. THF is added at 20° C. 0.08 ml (0.1 mmol) of acryloyl chloride and stirring is continued for a further 1 h.

The product is then hydrolyzed with H₂O, extracted with methylene chloride, and then the combined organic phases are washed with NH₄Cl solution, NaCO₃ solution, saturated NaCl solution, and are subsequently dried over MgSO₄ and concentrated. The product is purified by FCC.

Yield: 210 mg (0.3 mmol) 71%.

[α]_D =

Polymerization of (M₁) to form (P₁)

To a solution of 200 mg (0.3 mmol) of the monomer M₁ in 2 ml of THF are added 3 mg (0.018 mmol) of AIBN and a dry stream of nitrogen is passed through the solution for 10 min. The mixture is then stirred at 60° C. for 24 h.

After the mixture has been cooled, the polymer is precipitated by adding 8 ml of methanol and is purified by chromatography.

Yield: 70 mg = 35%.

The following response times are determined at a potential difference of 30 volts at different temperatures from a 2 μm cell used in the ferroelectric mode:

| T [°C.] | 44 | 50.7 | 53 |
|---|---|---|---|
| [ms] | 12 | 5 | 4 |

EXAMPLE 2

Preparation of the monomer (M₂)

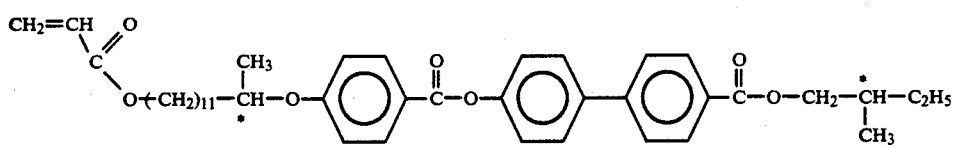

(A) (2S)-(+)-13-Benzyloxy-2-tridecanol (25)

0.38 g of Mg turnings (15.7 mmol) are covered with 20 ml of ether. 1 g from a total of 5.38 g (15.7 mmol) of alkyl bromide is slowly added. The mixture is briefly heated so that the ether boils and after the reaction has commenced, the remaining alkyl bromide is added. The reaction mixture is then stirred until all of the Mg turnings have dissolved. The mixture is then heated for 30 min at 40° C. The reaction solution is cooled to −20° C. and 0.3 g of Cu(I)I (10 mol%) is added. The mixture is stirred for 15 minutes. Then 1.83 g (31.5 mmol) of (S)-(−)-propylene oxide are added dropwise and the mixture is stirred overnight at room temperature. The reaction solution is then worked up using saturated $NH_4Cl$ solution and the aqueous phase is extracted with ether. This organic phase is dried using $MgSO_4$ and concentrated. A portion of the byproducts are distilled off at 50° C. and 0.05 Torr and the crude product which has been purified in this way is further purified by column chromatography (petroleum ether/ether with increasing polarity). This gives a yield of 0.8 g of (24) (17%) in the form of a colorless oil.

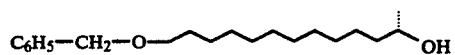

IR ($CHCl_3$) : 3610 ; 3540–3240 (OH) ; 2930 ($CH_2$) 1500 ; 1455 ; 1365 ; 1225 ; 1095 ; 940 cm$^{-1}$

(B)
2-Methylbutyl(2R'',2S)-(+)-4'-(-4''-(12''-benzyloxy-1''-dodecylmethyloxy)benzoyloxy)biphenyl-4-carboxylate](27)

To a solution of 0.84 g of (25) (2.7 mmol) and 1.1 g of (13) (2.7 mmol) and 0.7 g of triphenylphosphine (2.7 mmol) in 20 ml of abs. THF are added dropwise in the course of 5 min at 0° C. and with the exclusion of moisture 0.48 g of diethyl azodicarboxylate (2.7 mmol) in 5 ml of abs. THF. The mixture is stirred for 30 min at 0° C. and then for 48 hours at room temperature. The solvent is evaporated off, ether is added to the residue and this solution is separated from insoluble components. The solvent is evaporated off and then this residue is purified by column chromatography (petroleum ether/ether of increasing polarity). This gives a yield of 1.16 g of (27) (61%).

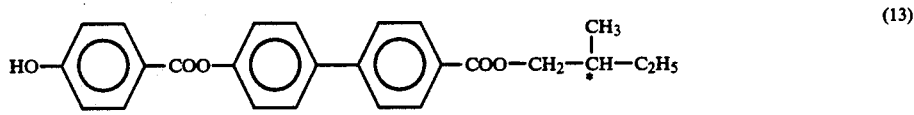

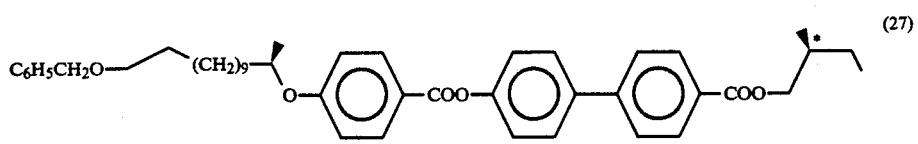

IR ($CHCl_3$) : 2930 ($CH_2$) ; 2860 ; 1715 (COOR) ; 1610 ; (Ar C=C) ; 1510 ; 1465 ; 1340–1190 (R—O—R); 1115 cm$^{-1}$

(C) 2-Methylbutyl (2R'',2S)-(+)-4'-(-4''-(12''-hydroxy-1''-dodecylmethyloxy)benzoyloxy-biphenyl-4-carboxylate](29)

To a solution of 1.2 g (2.1 mmol) of (27) in 250 ml of ethanol is added 0.16 [lacuna] of Pd/C (5% by weight) catalyst and the mixture is exposed at 50° C. for 2 hours to an atmosphere of hydrogen. The crude product is filtered through silica gel using ether/methylene chloride (1:1). The product is then purified by column chromatography (petroleum ether/ether). This gives a yield of 0.2 g of product (19%).

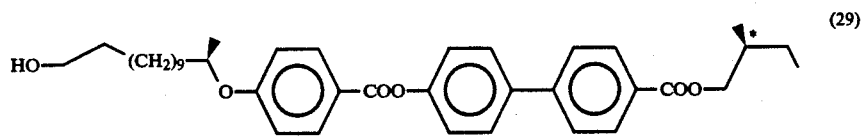

IR ($CHCl_3$) 2935 ($CH_2$) ; 2860 ; 1720 (COOR) ; 1610 (Ar C=C) ; 1510 ; 1465 ; 1375 ; 1340–1190 ; 1190 ; 1170 ; 1130 ; 1175 ; 1075 ; 1010 cm$^{-1}$

(D) (2R'',2S)-(+)-[2-Methylbutyl 4'-(4''-(12''-acryloyloxy-1''-dodecylmethyloxy)benzoyloxy)-4-biphenylcarboxylate] (M₂)

0.2 g (0.32 mmol) of (29) is first added to 10 ml of THF and then 67 mg (0.66 mmol) of triethylamine are added. The mixture is cooled to −70° C. and 33 mg (0.36 mmol) of acrylolyl chloride are added with the exclusion of light and the course of the reaction is monitored by thin layer chromatography. After the reaction has ended, the batch is purified directly by column chromatography (methylene chloride/methanol of increasing polarity). This gives a yield of 84 mg of the monomer (32) (38%) in the form of a colorless oil.

IR (CHCl$_3$): 2940 (CH$_2$); 2860; 1715 (COOR); 1610 (Ar C=C); 1510; 1465; 1235-1180 (R—O—R) cm$^{-1}$

Polymerization of (M$_2$) to form (P$_2$)

264 mg of (M$_2$) are dissolved in abs. THF and to this solution is added 1 mg of AIBN. The mixture is purged with nitrogen for 30 minutes and then polymerized at 60° C. for 8 h. The product is purified by chromatography.

Yield 80 mg = 30%.

The liquid-crystalline polymer has an average molecular weight Mw = 21,500.

$E = Mw/M_N = 1.82$.

EXAMPLE 3

Preparation of the monomer (M$_3$)

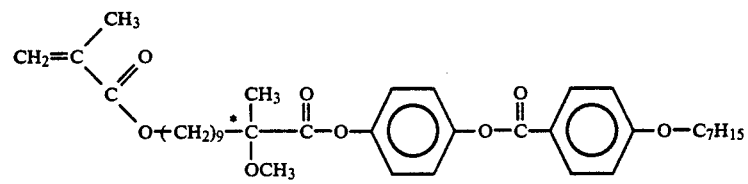

This synthesis is carried out according to the following scheme:

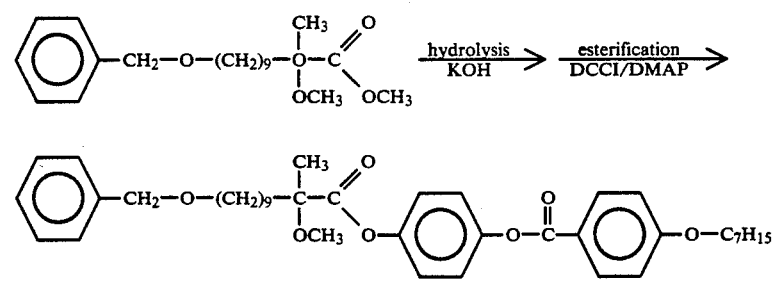

Spectroscopic data from (M$_3$).

| 400MHz-NMR (COCl$_3$): | H1 | 0.90 | t(3) J=7.0 |
|---|---|---|---|
| | H2.3.4 15.16.17 18.19.20 | 1.25-1.51 | m(18) |

| 400MHz-NMR (COCl$_3$): | H5 | 1.47 | q(2) J=7.0 |
|---|---|---|---|
| | H6 | 1.82 | q(2) J=7.0 |
| | H7 | 4.04 | t(2) J=7.0 |
| | H8 | 6.97 | d(2) J=9.0 |
| | H9 | 8.13 | d(2) J=9.0 |
| | H10 | 7.23 | d(2) J=9.0 |
| | H11 | 7.13 | d(2) J=9.0 |
| | H12 | 1.54 | s(3) |
| | H13 | 3.39 | s(3) |
| | H14 | 1.86-1.91 | m(2) |
| | H21 | 1.66 | q(2) J=7.0 |
| | H22 | 4.13 | t(2) J=7.0 |
| | H23 | 1.94 | dd(3) J=1.6/1.0 |
| | H24 | 6.09 | dt(1) J=1.5/1.0 |

| | H25 | 5.54 | dt(1) J=1.6/1.5 |
|---|---|---|---|

| IR: | 2,970 cm$^{-1}$ 2,890 cm$^{-1}$ | C—H stretching |
|---|---|---|
| | 1,770 cm$^{-1}$: | C=O stretching (ester of an aliphat. acid) |
| | 1,745 cm$^{-1}$: | C=O stretching (ester of an olefin. acid) |
| | 1,730 cm$^{-1}$: | C=O stretching (ester of an aromat. acid) |
| | 1,625 cm$^{-1}$: | C=C stretching |

Polymerization of (M$_3$) to form (P$_3$)

0.62 g of (+)-(2S)-4-(2-methoxy-2-methyl-11-(2'-methylpropenoyloxy)undecoyloxy)phenyl 4-heptoxybenzoate is dissolved in 5 ml of THF and to this solution are added 1.7 mg of AIBN under an atmosphere of dry nitrogen. The solution is stirred at 60° C. for 7 h. The resulting polymer is then precipitated in cold methanol at −20° C.

Yield: 0.45 g = 72%.

| 90MHz-NMR (CDCl$_3$): | H1 | 0.6-0.7 | m(3) |
|---|---|---|---|
| | H2.4.5.6 7.8.9.10 11.19.20 21.22.23 | 0.8-2.1 | m(28) |
| | H3.18 | 3.9-4.2 | m(4) |
| | H12 | 1.57 | sbr(3) |
| | H13 | 3.42 | sbr(3) |
| | H14.15 | 7.2-7.3 | m(4) |
| | H16 | 8.18 | dbr(2) J=9 |
| | H17 | 7.00 | dbr(2) J=9 |
| | H24 | 0.8-1.1 | m(3) |

The polymer (P$_3$) has an average molecular weight of 76,000 g/mol and has the following phase transition temperatures:

Tg −6 S. 40 I. $E = Mw/M_N = 2.12$.

EXAMPLE 4

Preparation of the monomer (M4)

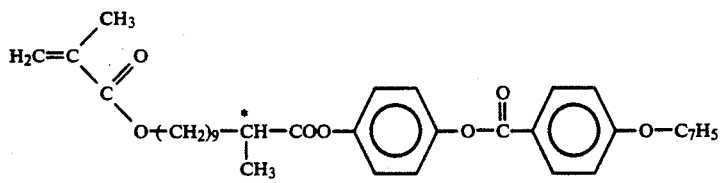

The synthesis is carried out in accordance with the following scheme:

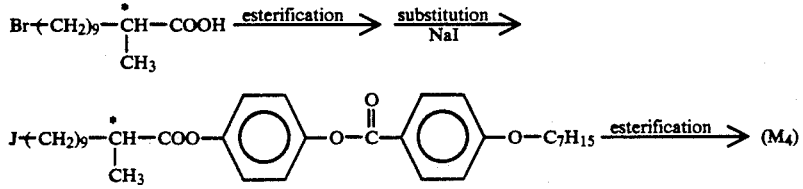

Polymerization of (M4) to form (P4)

0.6 g of the monomer (M4) is dissolved in 5 ml of abs. THF and to this solution are added 1.7 mg of AIBN and the mixture is stirred at 60° C. for 3 h. The polymer is separated off and purified by chromatography.

The polymer has an average molecular weight of Mw 125,000 g/mol and has the following phase transition temperatures:

Tg $-12$ S. 42 I. E=Mw/$M_N$=4.31.

EXAMPLE 5

General instructions

I General instructions for esterification using dicyclohexylcarbodiimide

To 1 mmol of the relevant alcohol in 10 ml of abs. $CH_2Cl_2$ are added with stirring and the exclusion of moisture 15 mol % of 4-dimethylaminopyridine (DMAP) and 1 mmol of the carboxylic acid. The mixture is cooled to 0° C. and then 1 mmol of dicyclohexylcarbodiimide (sic) (DCC) is added. The mixture is then stirred at 0° C. for 30 min and at room temperature for 18 h.

The precipitated substance is filtered off and the $CH_2Cl_2$ phase is washed with water, dried over $MgSO_4$ and the solvent is evaporated off.

II General instructions for splitting tetrahydropyranyl ethers (THP ethers)

A solution of 5 mmol of THP ether and 0.5 mmol of PPTS (pyridinium p-toluenesulfonate) in 40 ml of ethanol is stirred at 55° C. (oil bath temperature) for 3 h. The solvent is evaporated off and the residue is washed with $H_2O$.

III General instructions for the preparation of polyacrylates by free-radical polymerization 0.5 g of monomer is dissolved in 5 g of toluene which has previously been distilled over lithium aluminum hydride, and to this solution is added 1 mol % of AIBN (azodiisobutyronitrile) which has previously been recrystallized from ether and dissolved in toluene. Then nitrogen which has been dried over $P_2O_5$ is passed through the solution for 5 min, the reaction vessels are closed and the contents maintained at 70° C. for 48 h. The polymers are purified by gel permeation chromatography or by reprecipitation.

B) Preparation of the monomer M5

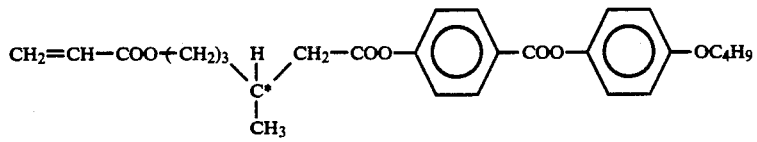

4-Butoxyphenyl 4-tetrahydropyran-2-yl-oxy-benzoate (3)

In accordance with the general instructions (I) 5.23 g (38 mmol) of 4-butoxyphenol, 0.7 g of DMAP and 6.5 g (38 mmol) of DCC are added to 7 g (32 mmol) of (2). The crude product is purified by column chromatography (eluent $CH_2Cl_2$). This gives a colorless oil.

Yield: 8.36 g (72%).

4-Butoxyphenyl 4-hydroxybenzoate (4)

In accordance with the general instructions II, 8.36 g (23 mmol) of (3) are dissolved in 180 ml of ethanol and to this solution are added 573 mg (2.3 mmol) of PPTS and the mixture is stirred at 55° C. (oil bath temperature) for 6 h. Ethanol is distilled off, then ether is added to the residue and this mixture is washed with $H_2O$, dried over $MgSO_4$, and the solvent is evaporated off.

Yield: 6.08 g (93%).

M.p.: 153° C.

Methyl (R)-(+)-6-Hydroxy-3-methylhexanoate (10)

9.42 g (51 mmol) of methyl (R)-(+)-citronellate (9) are dissolved in 26 ml of methanol and saturated with 2.45 g (51 mmol) of $O_3$ for 1 h at $-30°$ C. Then 3.12 g (82 mmol) of $NaBH^4$ (sic) are added in small portions with stirring. During the highly exothermic reaction, which lasts for 2 h, the temperature is kept between −20° C. and +10° C. Then cooling is discontinued and the mixture is brought to room temperature. A high proportion of the methanol is distilled off and to the residue are added 80 ml of CHCl₃. This mixture is added at 0° C. to a vigorously stirred solution of 50 ml of conc. HCl in 100 g of ice. The chloroform phase is washed once with Na₂CO₃ solution and three times with H₂O and is then dried over MgSO₄ and concentrated. The crude product is distilled through a bulb tube.

Yield: 5.12 g (68%).
$[\alpha]_D^{20} = +9.3°$ (c=1 in chloroform).
B.p.: 85° C.

Methyl (3R)-6-Tetrahydropyran-2-yl -oxy-3-methylhexanoate (11)

In accordance with the general instructions II, 3 g (19 mmol) of (10) are stirred with 2.15 g (27.5 mmol) of DHP and 152 mg of an acidic ion exchanger at 0° C. for 2 h. The crude product is distilled through a bulb tube.

Yield: 4.64 g (100%).

(3R)-6-Tetrahydropyran-2-yl-oxy-3-methylhexanoicacid(5)

In accordance with the general instructions (I), 2.5 g (10 mmol) of (11) are stirred with 1.15 g (20 mmol) of KOH in 20 ml of ethanol for 3 h at 80° C. The clear reaction mixture is freed in vacuo from ethanol and then ice-water is added and also a layer of ether. To this mixture are added dropwise at 0° C. and with vigorous stirring 20 ml of 1 N HCl. The organic phase is separated off, washed with H₂O, dried over MgSO₄ and concentrated. This viscous residue is reacted without further purification.

4-Butoxyphenyl (3R)-4-(6-tetrahydropyran-2-yl-oxy)-3-methylhexanoyloxybenzoate (6)

In accordance with the general instructions (I), 2.6 g (9.1 mmol) of (4) are reacted with 2.09 g (9.1 mmol) of (5), 167 mg of DMAP and 1.87 g (9.1 mmol) of DCC. The product is purified by column chromatography (eluent E/PE, 1:1). This gives a colorless oily liquid.

Yield: 3.01 g (67%).

4-Butoxyphenyl (3R)-4-(6-hydroxy-3-methylhexanoyl)-oxybenzoate (7)

In accordance with the general instructions II, 3 g (6 mmol) of (6) are dissolved in 50 ml of ethanol and to this solution is added 0.15 g (0.6 mmol) of PPTS and the mixture is stirred for 3 h at 55° C. (oil bath temperature). The reaction mixture is concentrated, ether is added, and the mixture is washed three times with H₂O, dried over MgSO₄ and concentrated.

Yield: 2.01 g (81%).
$[\alpha]_D^{20} = -$.
M.p. 55° C.

4-Butoxyphenyl (3R)-4-(6-acryloyloxy-3-methylhexanoyl)oxy-benzoate (8)

In accordance with the general instructions (I), 404 mg (4.8 mmol) of acrylic acid, 88 mg of DMAP and 0.99 g of DCC are added to 1.99 g (4.8 mmol) of (7). The product is purified by column chromatography (eluent CH₂Cl₂). This gives a reddish-colored viscous liquid.

Yield: 1 1 g (49%).
$[\alpha]_D^{20} = +6.8°$ (c=1.12 in chloroform).

Polymerization to (P₅)

Poly(1-(4-butoxyphenoxycarbonyl)phenoxycarbonyl-(3R)-3-methylpentanoxycarbonyl)ethylene)

In accordance with the general instructions (III), 0.55 g (1.18 mmol) of (8) is dissolved in 5 ml of abs. toluene and to this solution are added 2 mg of azoisobutyronitrile.

The reaction mixture is kept at 60° C. for 48 h. The solution is cooled and then poured into 50 ml of methanol and the precipitated polymer is filtered off under suction and washed with methanol.

Yield: 12 mg (2.2%).
$[\alpha]_D^{20} = +7.4°$ (c=0.72 in chloroform)
The liquid-crystalline polymer has an average molecular weight Mw>10⁶.

If the polymerization is carried out in THF at 62° C. (7 h), a polymer is obtained having an average molecular weight Mw=22,000 and with the following phase transition temperatures: Tg 38 $S_c^*$ 97 $S_A$ 103 I

EXAMPLE 6

Preparation of the monomer (M₆)

In accordance with the method of Meyers et al in J.A.C.S. 98, p. 567 (1976), (1S, 2S)-(+)-1-phenyl-2-amino-1,3-propanediol and the orthoester of the formula

were used to prepare the oxazoline compound of the formula

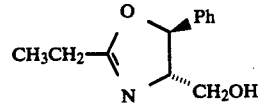

and this was then converted using sodium hydride/-methyl iodide into the corresponding methoxy compound of the formula

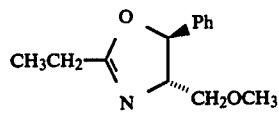

This compound was metallated with LDA and then brought into an addition reaction at −98° C. with the compound of the formula

CH₃OC₄H₈I

This gave a yield of 25% of the compound of the formula

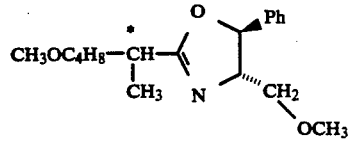

2.13 g of this compound were heated with 4N H₂SO₄ for 3.5 h under reflux. Working-up gave 1.16 g of the compound of the formula $$CH_3O(CH_2)_4-\overset{H*}{\underset{CH_3}{\overset{|}{C}}}-COOH$$

$[\alpha]_D^{20}$: +6.4° (c=1.06 in CHCl$_3$).

1.08 g of this methyl ether were dissolved in abs. CH$_2$Cl$_2$, cooled to 0° C., and to this solution was slowly added a solution of 6.75 mmol of BBr$_3$ in CH$_2$Cl$_2$. The reaction mixture was stirred overnight at room temperature. The product was then hydrolyzed by adding water and the organic phase was dried using MgSO$_4$, concentrated and this residue distilled in vacuo.

Yield: 870 mg (62%) of the compound of the formula $$BrCH_2(CH_2)_4\diagup\overset{CH_3}{\underset{H}{\overset{\vdots}{C}}}\diagdown\underset{O}{\overset{\|}{C}}-OH$$

$[\alpha]_D^{20}$: +3.5°, c=1.07 in CHCl$_3$.

This acid was esterified with a compound of the formula $$HO-\bigcirc-COO-\bigcirc-OC_4H_9$$

in CH$_2$Cl$_2$ and in the presence of dicyclohexylcarbodiimide.

This gave a yield of 83% of the compound of the formula $$BrCH_2(CH_2)_4\diagup\overset{CH_3}{\underset{H}{\overset{\vdots}{C}}}\diagdown COO-\bigcirc-COO-\bigcirc-OC_4H_9$$

$[\alpha]_D^{20}$: +6°; c=1.5 in CHCl$_3$.

1.5 g of this compound were reacted with 3.51 mg of lithium acrylate in HMPA at 40° C., with stirring, over a period of 48 h. This gave a yield of 52% of the compound of the formula $$CH_2=CH-COO-(CH_2)_4\diagup\overset{CH_3}{\underset{H}{\overset{\vdots}{C}}}\diagdown COO-\bigcirc-COO-\bigcirc-OC_4H_9$$

Polymerization to (P$_6$)

This compound was polymerized by heating 720 mg of the monomer M$_6$ in tetrahydrofuran at 60° C. for 24 hours in the presence of azoisobutyronitrile as initiator.

The liquid-crystalline polymer has an average molecular weight Mw=9,600 g/mol. E=Mw/M$_N$=1.73.

The polymer has a smectic phase in the temperature range from 10°–40° C.

EXAMPLE 7

The monomer (M$_7$) is synthesized in a manner similar to that for (M$_1$).

$$CH_2=\underset{C}{\overset{CH_3}{\underset{\diagdown}{\diagup}}}\overset{O}{\underset{\diagdown}{\overset{\|}{C}}}-O+CH_2)_9-\overset{CH_3}{\underset{OCH_3}{\overset{|}{\underset{|}{C}}}}-COO-\bigcirc-\overset{O}{\overset{\|}{C}}-O-\bigcirc-\bigcirc-O-C_{10}H_{21}$$

The polymerization is also carried out similary to that in Example 1.

The polymer (P$_7$) has an average molecular weight Mw=400,000. E=Mw/M$_N$=1.68.

We claim:

1. A ferroelectric, liquid-crystalline polymer containing repeating units of the formula (I)

$$-CH_2-\underset{\underset{O}{\overset{\diagdown}{C}}}{\overset{Y}{\underset{|}{\overset{|}{C}}}}\overset{O}{\underset{\diagup}{\|}}$$
$$O-(CH_2)_a-B-M^1+(A^1)_b-(M^2)_c-(A^2)_d-(M^3)_e-(A^3)_f-R^1$$

in which

B is a group having at least one chiral center of the formula $$\overset{R^6}{\underset{|}{CH}}-\overset{R^7}{\underset{R^8}{\overset{|}{C}}}$$

where $R^6$, $R^7$ and $R^8$ are identical or different and are H, CH$_3$ or OCH$_3$, and at least one of the groups $R^6$, $R^7$ and $R^8$ must be H, with the proviso that $R^7$ and $R^8$ must not be identical if $R^6$ is H, Y is H or CH$_3$, $R^1$ is straight-chain or branched (with or without an asymmetric carbon atom) alkyl having 1 to 16 carbon atoms, in which one —CH$_2$— group may also be replaced by —O—, —CO—O— or —O—CO—, a is 2 to 20, b, c, d, e and f are 0 or 1 with the proviso that d+e+f=2 or 3, $A^1$, $A^2$ and $A^3$ are 1,4-phenylene, $M^2$ and $M^3$ are identical or different CO—O or O—CO, and

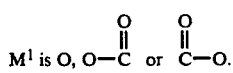

2. The ferroelectric, liquid-crystalline polymer as claimed in claim 1, wherein a is 6 to 12.

3. The ferroelectric, liquid-crystalline polymer composed of repeating units of the formula (I) as claimed in claim 2 wherein the group $(-A^1)_b(M^2)_c(-A^3)_d(-M^3)_f-$ is:

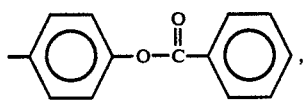

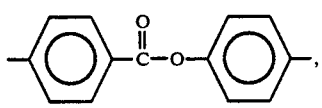

-continued

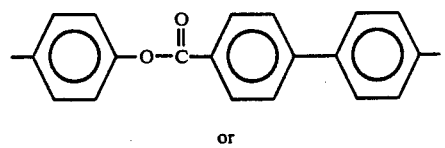

or

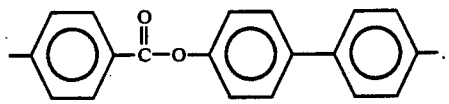

4. The ferroelectric, liquid-crystalline copolymer composed of at least two different units of the formula (I) as claimed in claim 1.

5. A process for the preparation of the polymer as claimed in one of claims 1 to 4, which comprises polymerizing compounds of the formula (II)

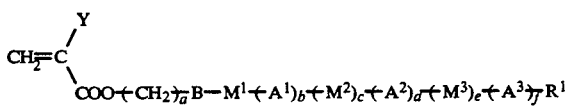

using a free-radical former.

6. An electrooptical component containing a polymer as claimed in one of claims 1 to 4.

* * * * *